SINGLE-STAGE TRANSISTOR OSCILLATOR, PARTICULARLY FOR COMMUNICATION SYSTEMS

Filed Oct. 1, 1959

United States Patent Office 3,072,862

Patented Jan. 8, 1963

3,072,862
SINGLE-STAGE TRANSISTOR OSCILLATOR, PARTICULARLY FOR COMMUNICATION SYSTEMS

Francesco Semeria, Milan, and Santo Montagna, Bollate, Italy, assignors to Siemens Societa per Azioni, Milan, Italy, a corporation of Italy Filed Oct. 1, 1959, Ser. No. 843,881
Claims priority, application Italy Oct. 11, 1958
6 Claims. (Cl. 331—117)

Our invention relates to transistor oscillators or similar semiconductor oscillators, particularly for use in communication systems.

In the conventional single-stage transistor oscillators, the oscillation frequency, determined by the inductance L and the capacitance C of the oscillatory circuit, is influenced by the operating temperature of the transistor as well as by the actual parameter values of the transistor being used, which values may differ within a wide range due to manufacturing tolerances.

The known methods for compensating the effects of temperature variations in such oscillators require the provision of additional components such as resistors, thermistors and the like, various examples of such compensating methods being described in the pertinent technological literature.

So far, however, there has been no simple and economical solution for the problem of eliminating the effects of the spread in parameter values of a transistor of given type, this being of utmost importance for economical large-scale production of a given type of oscillator.

In the above-mentioned conventional transistor oscillators, the stability of the generated frequency and its distortion are further dependent to an appreciable extent upon the stability and the characteristics of the load devices connected to the oscillator.

It is an object of our invention to devise a single-stage transistor oscillator, suitable particularly for communication systems, which eliminates the above-mentioned disadvantages.

According to our invention we insert into the emitter circuit of the transistor a resistor and a series-resonance circuit in parallel to that resistor. We further couple the emitter circuit with the base circuit of the transistor by phase-reversing means which supply the signal, derived from the emitter circuit, the transistor base through phase compensating means serving to secure excitation and maintenance of the oscillations at the most favorable degree of efficiency, the output signal of the oscillator being taken from the collector circuit of the transistor.

In such a device the frequency of the generated oscillations is essentially determined by the inherent parameter values of the series-resonance circuit which preferably possesses a high L/C ratio.

The invention will be further explained with reference to the accompanying drawing exemplifying in FIGS. 1 and 2 the schematic circuit diagrams of two different embodiments.

Figure 1:
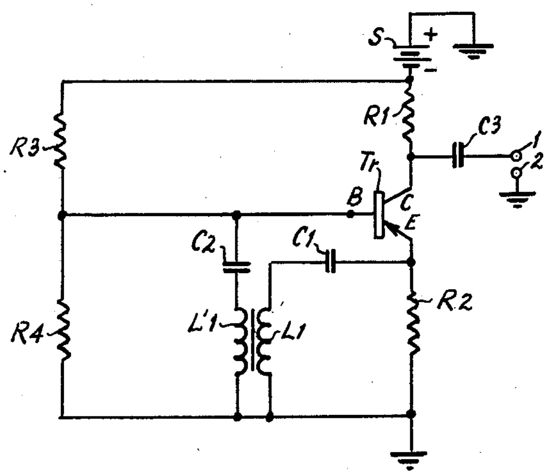

The oscillator according to FIG. 1 comprises a transistor T*r*, for example a p-n-p junction transistor, whose collector C is connected through a resistor R1 to one pole of a current source S, the other pole being shown grounded. The emitter E of transistor T*r* is connected to ground or mass through a high ohmic counter-coupling resistor R2. A series-resonance circuit composed of an induction coil L1 and a capacitor C1 is connected in parallel relation to resistor R2. The resonance circuit is tuned to the desired frequency *f*. The induction coil L1 is inductively coupled with a secondary winding L'1 for phase reversal, which is connected between mass and base electrode B through a capacitor C2 which serves to isolate the base electrode from the mass. The base B is connected to the tap point of a voltage divider formed by two resistors R3 and R4 upon which the voltage of source S is impressed.

According to another feature of the invention the capacitance of capacitor C2 is so chosen that the voltage induced in winding L'1 is injected into the base electrode with the phase angle that secures excitation and maintenance of the oscillations at the most favorable degree of efficiency. The generated signal is taken from output terminals 1 and 2 through a coupling capacitor C3.

Since the transistor T*r*, in its emitter circuit, is subjected to a strong counter-coupling by resistor R2, which in the case of a transistor of small power capacity may have a value of some thousand ohms for example, the normal variations of the input parameters of the transistor and the temperature-dependent fluctuations of these parameters are of negligible magnitude in comparison with the value of R2. For that reason, the frequency of a transistor oscillator according to the invention is virtually determined only by the values of L1, C1, C2 and by the rated parameter values of the transistor being used, and thus are not affected within wide limits by the variations in operating temperature of the transistor.

For some purposes, the capacitor C1, shown as a fixed capacitor, may be given adjustable capacitance in order to afford a desired frequency adjustment over a given frequency range.

The described oscillator does not necessarily require parallel-resonance or tank-circuit components in the collector circuit, although in some cases the addition of a tank circuit is preferable, for example if the oscillator is to supply a relatively large power output and/or a virtually distortion-free oscillation.

It is apparent from the foregoing that the excitation and maintenance of the oscillations are locally limited between emitter and base circuits, and that the collector circuit, decoupled by the internal resistance of the transistor, does not participate in generating these oscillations. For that reason, the external load circuit connected to the output terminals 1 and 2 (FIGS. 1 and 2) has virtually no appreciable influence upon the frequency and wave-shape of the signal generated by the oscillator, neglecting such practically non-extant limit conditions as may be caused by gross impedance matching errors.

The phase reversal introduced by means of the secondary winding L'1 of inductance coil L1 may, of course, be obtained by other means known as such, for example with the aid of a transformer separate from the inductance coil L1, without departing from the scope of the present invention.

Figure 2:
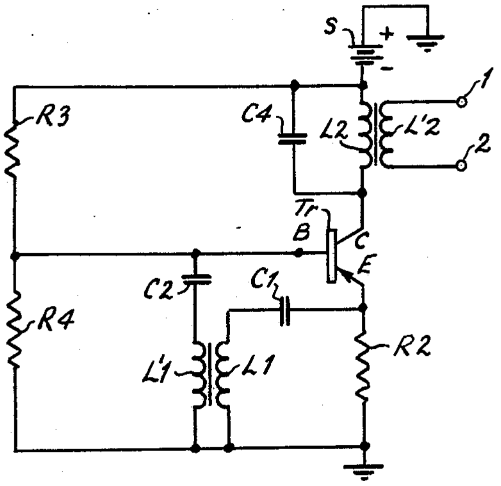

The embodiment shown in FIG. 2 differs from that of FIG. 1 in that the collector circuit of the transistor, in lieu of resistor R1 and capacitor C3, is equipped with a tank circuit composed of an inductance coil L2 and a parallel-connected capacitor C4. This tank circuit is tuned to the frequency of the the oscillator and permits taking from the output terminals 1, 2 of a secondary winding L'2 a larger power output and/or a practically distortion-free wave shape. An embodiment of this type has the further, considerable advantage that the output circuit is symmetrical relative to mass (ground).

The output circuit between terminals 1 and 2 may also be coupled with the inductance coil L2 through a capacitor as shown at C3 in FIG. 1 so that the coil L2 takes the place of resistor R1 in FIG. 1 and the secondary winding L'2 is not needed.

In accordance with the use of p-n-p transistors in the illustrated embodiments, the voltage source S is shown to have its plus pole grounded for operation of the transistor in grounded-emitter connection. The particular poling, however, is not critical to the invention. For example, the illustrated embodiments described above may also be provided with a n-p-n transistor Tr in which case the negative polarity of the voltage source S is to be reversed.

The invention is generally applicable for various purposes of communication techniques, including radio techniques and personnel paging systems for remote-measuring and remote-controlling purposes and the like, where the required degree of accuracy and frequency-stability are between the corresponding requirements that can be met by a conventional single-stage transistor oscillator on the one hand, and a quartz-stabilized transistor oscillator on the other hand.

Further examples of advantageous use of the invention are audio-frequency oscillators for voice-frequency telegraphy and long-distance dialing purposes, oscillators to serve as transmitters of electric signals such as used for remote measuring, remote controlling, or subscriber selection by means of predetermined frequency sequences. Further uses are for fixed and adjustable oscillators to be used in radio, television and measuring instruments.

We claim:

1. A single-stage oscillator, comprising direct-voltage supply means, a transistor having a base circuit and having respective emitter and collector circuits serially connected across said voltage supply means, an inductance coil and a capacitor connected in series with each other and forming an oscillatory circuit connected with said emitter circuit, said coil having a secondary winding connected in said base circuit for passing a phase-reversed signal from said oscillatory circuit to said base circuit, phase correction means connected in said base circuit, impedance means connected in said collector circuit, and output terminals connected with said collector circuit to furnish the oscillator output signals.

2. In a single-stage transistor oscillator according to claim 1, said coupling means comprising transformer means having a primary winding in said emitter circuit and a secondary winding in said base circuit.

3. In a single-stage transistor oscillator according to claim 1, said phase correction means comprising a capacitor serially connected with said coupling means in said base circuit.

4. A single-stage transistor oscillator, comprising direct-voltage supply means, a transistor having a base circuit and having respective emitter and collector circuits serially connected across said voltage supply means, a resistor connected in said emitter circuit, an inductance coil and a capacitor connected in series with each other across said resistor and forming an oscillatory circuit, said coil having a secondary winding connected in said base circuit, another capacitor serially connected with said secondary winding, whereby a signal is supplied from said emitter circuit to said base circuit through said secondary winding and said other capacitor, impedance means connected in said collector circuit, and output terminals connected with said collector circuit to furnish the oscillator output signal.

5. A single-stage transistor oscillator, comprising direct-voltage supply means, a transistor having a base circuit and having respective emitter and collector circuits serially connected across said voltage supply means, a resistor connected in said emitter circuit, an inductance coil and a capacitor connected in series with each other across said resistor and forming an oscillatory circuit, said coil having a secondary winding connected in said base circuit for passing a phase-reversed signal from said oscillatory circuit to said base circuit, phase correction means connected in said base circuit, another resistor serially connected in said collector circuit, another capacitor, and an output-signal circuit connected with said other resistor through said other capacitor.

6. A single-stage transistor oscillator, comprising direct-voltage supply means, a transistor having a base circuit and having respective emitter and collector circuits serially connected across said voltage supply means, a resistor connected in said emitter circuit, series-resonance circuit connected in parallel to said resistor and comprising an inductance member and a capacitance member, phase-reversing means coupling said base circuit with said emitter circuit and phase correction means connected in said base circuit for supplying from said emitter circuit through said coupling means and phase correction means a signal to the transistor base to excite oscillations in said resonance circuit, a tank circuit connected in said collector circuit and tuned to the frequency of said series-resonance circuit, and a signal-output circuit coupled with said tank circuit.

References Cited in the file of this patent

UNITED STATES PATENTS

| | | |
|---|---|---|
| 2,382,954 | Beaudoin | Aug. 21, 1945 |
| 2,878,386 | Chow et al. | Mar. 17, 1959 |

OTHER REFERENCES

Seely: Radio Electronics, McGraw-Hill Book Co., Inc., New York, 1956, chaps. 6 and 8.

Turner: Transistors, Theory and Practice, Gernsback, New York, 1958, pp. 83–87.